United States Patent
Yuki et al.

(10) Patent No.: US 9,340,175 B2
(45) Date of Patent: May 17, 2016

(54) SIDE AIRBAG, AIRBAG APPARATUS, METHOD OF MAKING SIDE AIRBAG

(71) Applicants: Tatsuya Yuki, Tokyo (JP); Masatoshi Yokota, Tokyo (JP)

(72) Inventors: Tatsuya Yuki, Tokyo (JP); Masatoshi Yokota, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/571,516

(22) Filed: Dec. 16, 2014

(65) Prior Publication Data

US 2015/0183394 A1   Jul. 2, 2015

(30) Foreign Application Priority Data

Dec. 27, 2013   (JP) ................................. 2013-272773

(51) Int. Cl.
*B60R 21/233* (2006.01)
*B60R 21/231* (2011.01)
*D05B 1/26* (2006.01)
*D05B 13/00* (2006.01)

(52) U.S. Cl.
CPC ......... *B60R 21/23138* (2013.01); *B60R 21/233* (2013.01); *D05B 1/26* (2013.01); *D05B 13/00* (2013.01); *B60R 2021/23308* (2013.01)

(58) Field of Classification Search
CPC ............... B60R 21/23138; B60R 2021/23146; B60R 2021/23308; B60R 2021/23324; B60R 21/233
See application file for complete search history.

(56) References Cited

U.S. PATENT DOCUMENTS

| | | |
|---|---|---|
| 6,976,702 B2 | 12/2005 | Yokota et al. |
| 8,480,124 B2 | 7/2013 | Rickenbach et al. |
| 2004/0119269 A1 | 6/2004 | Yokota et al. |
| 2006/0071458 A1 | 4/2006 | Sendelbach et al. |
| 2013/0093168 A1 | 4/2013 | Przybysz et al. |

FOREIGN PATENT DOCUMENTS

| | | |
|---|---|---|
| DE | 102010018180 | 10/2011 |
| EP | 1273486 | 1/2003 |
| GB | 2419116 | 4/2006 |
| JP | 2004-196162 | 7/2004 |
| JP | 4161705 | 10/2008 |
| JP | 2014-502580 | 2/2014 |
| WO | 03/101788 | 12/2003 |

OTHER PUBLICATIONS

Extended European search report dated May 8, 2015.

*Primary Examiner* — Ruth Ilan
(74) *Attorney, Agent, or Firm* — IPUSA, PLLC (57) ABSTRACT

A side airbag includes a panel having a first left face and a first right face and folded along a fold line to form a chamber, another panel having a second left face and a second right face and folded to form a chamber, wherein the second left face has a left edge part joined to the first left face along a line from an upper edge part to a lower edge part of the first left face at a position closer to the fold line than to a left edge part of the first left face, and the second right face has a right edge part joined to the first right face along a line from an upper edge part to a lower edge part of the first right face at a position closer to the fold line than to a right edge part of the first right face.

7 Claims, 7 Drawing Sheets

SIDE AIRBAG, AIRBAG APPARATUS, METHOD OF MAKING SIDE AIRBAG

BACKGROUND OF THE INVENTION

1. Field of the Invention

The disclosures herein relate to a side airbag, an airbag apparatus, and a method of making a side airbag.

2. Description of the Related Art

Patent Document 1, for example, discloses a side airbag.

A side airbag is stored in a casing in a folded state. The shape of a side airbag disclosed in Patent Document 1 tends to cause the size of the side airbag in a folded state to be relatively large. Such a relatively large size of a side airbag in a folded state may cause inconvenience from the viewpoint of installment in a vehicle because of a need for a large casing, for example.

Accordingly, it may be desirable to provide a side airbag that can be folded into a compact size.

[Patent Document 1] Japanese Patent Application Publication No. 2004-196162

SUMMARY OF THE INVENTION

According to an embodiment, a side airbag includes a first panel having a first left face and a first right face, the first panel being folded along a fold line such that the first left face overlaps the first right face to form a first chamber therebetween, a second panel having a second left face and a second right face, the second panel being folded such that the second left face overlaps the second right face to form a second chamber therebetween, wherein the first panel has a hole that allows flow of gas from the first chamber to the second chamber, wherein the second left face has a second left edge part joined to the first left face along a line from a first upper edge part of the first left face to a first lower edge part of the first left face at a position closer to the fold line of the first panel than to a first left edge part of the first left face, and wherein the second right face has a second right edge part joined to the first right face along a line from a second upper edge part of the first right face to a second lower edge part of the first right face at a position closer to the fold line of the first panel than to a first right edge part of the first right face.

According to an embodiment, a method of making a side airbag includes a left-part joining step of joining a first left face of a first panel and a second left face of a second panel by joining a second left edge part of the second left face to the first left face along a line from a first upper edge part of the first left face to a first lower edge part of the first left face at a position closer to an opening formed through the first panel than to a first left edge part of the first left face, a right-part joining step of joining a first right face of the first panel and a second right face of the second panel by joining a second right edge part of the second right face to the first right face along a line from a second upper edge part of the first right face to a second lower edge part of the first right face at a position closer to the opening formed through the first panel than to a first right edge part of the first right face, a fold step of folding the first panel and the second panel such that the first left face and the first right face overlap each other and such that the second left face and the second right face overlap each other, and a upper-part-&-lower-part joining step of joining the first upper edge part and the second upper edge part, joining the first lower edge part and the second lower edge part, joining a third upper edge part of the second left face and a fourth upper edge part of the second right face, and joining a third lower edge part of the second left face and a fourth lower edge part of the second right face.

According to at least one embodiment, a side airbag can be folded into a compact size.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

<Configuration of Side Airbag>

Figure 1:
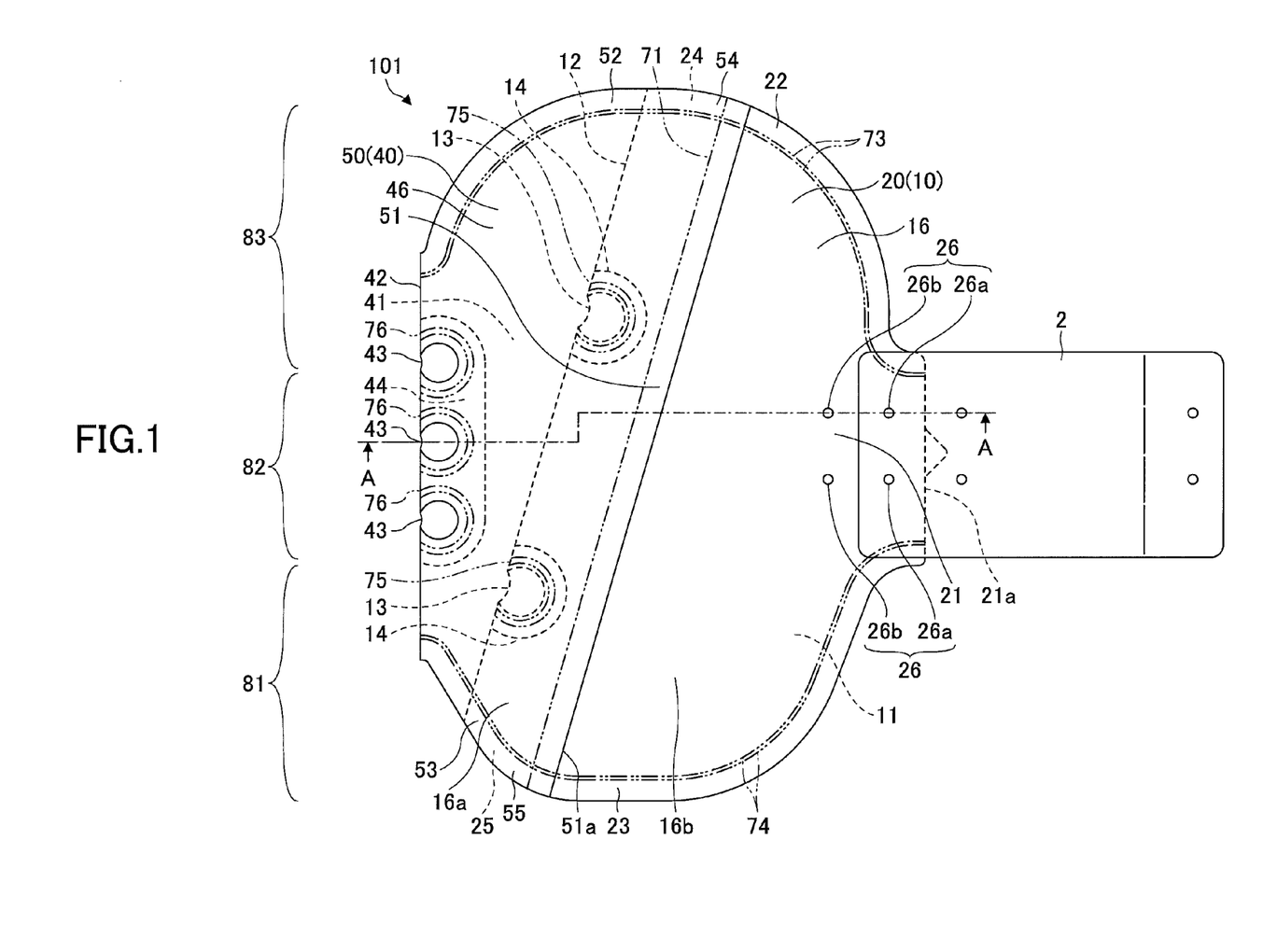
FIG. 1 is a side view of an example of a side airbag as viewed from a given side.
Figure 2:
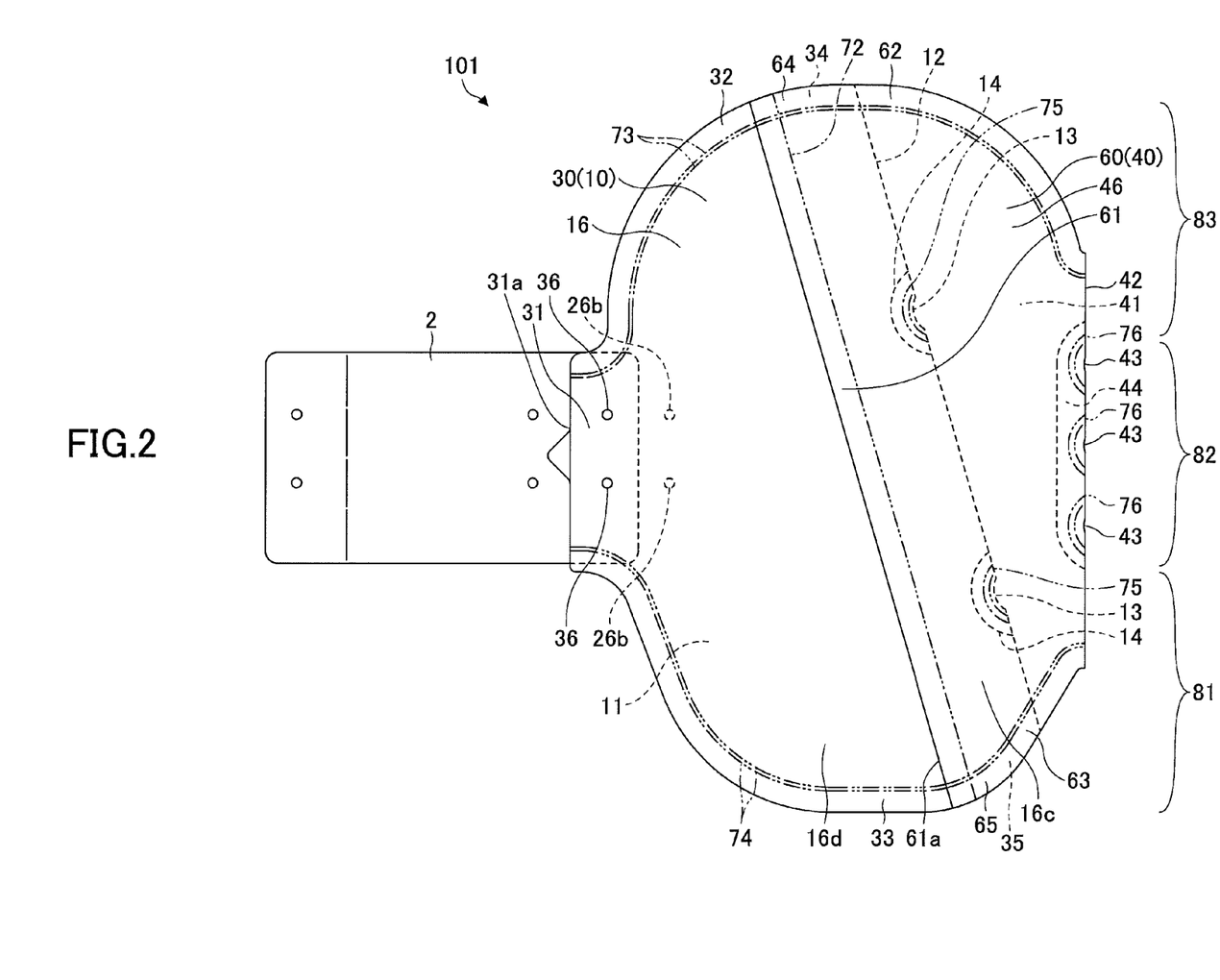
FIG. 2 is a side view of the example of a side airbag as viewed from the opposite side.
Figure 3:
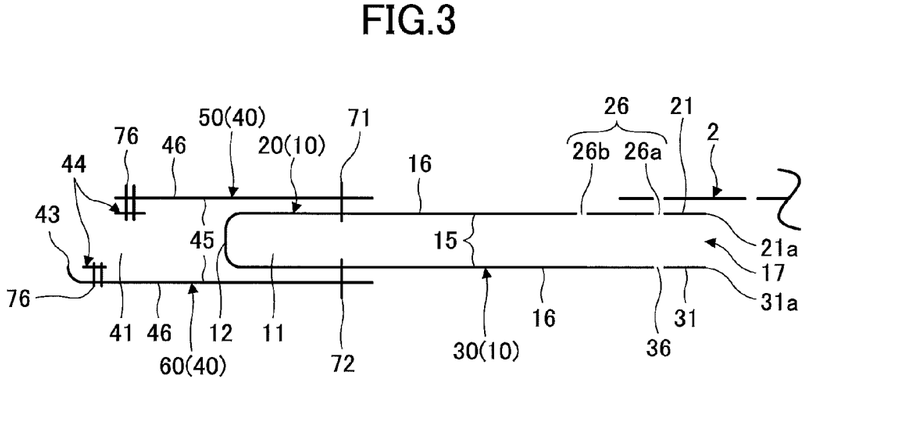
FIG. 3 is a drawing illustrating a cross-section of the side airbag taken along a line A-A in FIG. 1.

FIG. 1 is a side view of a side airbag 101 as viewed from a given side. FIG. 2 is a side view of the side airbag 101 as viewed from the other side (i.e., opposite side to the given side). FIG. 3 is a drawing illustrating a cross-section of the side airbag 101 taken along a line A-A in FIG. 1. FIGS. 1 through 3 illustrate the side airbag 101 before the side airbag 101 is folded.

The side airbag 101 is an occupant protective member having a bag shape so as to expand and to be unfolded between a side wall of a vehicle and a passenger sitting in a vehicle seat by gas supplied from an inflator 1 as will be described later. The side airbag 101 includes a chamber 11 formed by a panel 10 folded flat, a camber 41 formed by a panel 40 folded flat, and a protector cloth 2 that encloses the side airbag 101 in a folded state.

Each of the panel 10, the panel 40, and the protector cloth 2 is a ground fabric having a sheet shape. The panel 10 has at least one passage hole 13 (see FIG. 1 and FIG. 2). The passage hole 13 is an example of an opening that enables the flow of gas from the chamber 11 to the camber 41 as the gas is supplied from the inflator 1 that will be described later. FIG. 1 and FIG. 2 illustrate an example in which two passage holes 13 are formed through the panel 10. The panel 40 has at least one vent hole 43. The vent hole 43 is an opening that enables the exhaustion of gas from the camber 41 to outside the camber 41. FIG. 1 and FIG. 2 illustrate an example in which three vent holes 43 are formed through the panel 40.

The chamber 11 is an expansion room that is formed by the panel 10 folded flat along a fold line 12 such that a left face 20 of the panel 10 and a right face 30 of the panel 10 are placed one over another. The panel 10 has an outer face 16 that is a front face and an inner face 15 that is a back face. The panel 10 is folded flat such that the inner face of the left face 20 faces the inner face 15 of the right face 30 (see FIG. 3).

The chamber 41 is an expansion room that is formed by the panel 40 folded flat along a fold line 42 such that a left face 50 of the panel 40 and a right face 60 of the panel 40 are placed one over another. The panel 40 has an outer face 46 that is a front face and an inner face 45 that is a back face. The panel 40 is folded flat such that the inner face of the left face 50 faces the inner face 45 of the right face 60 (see FIG. 3).

Figure 4:
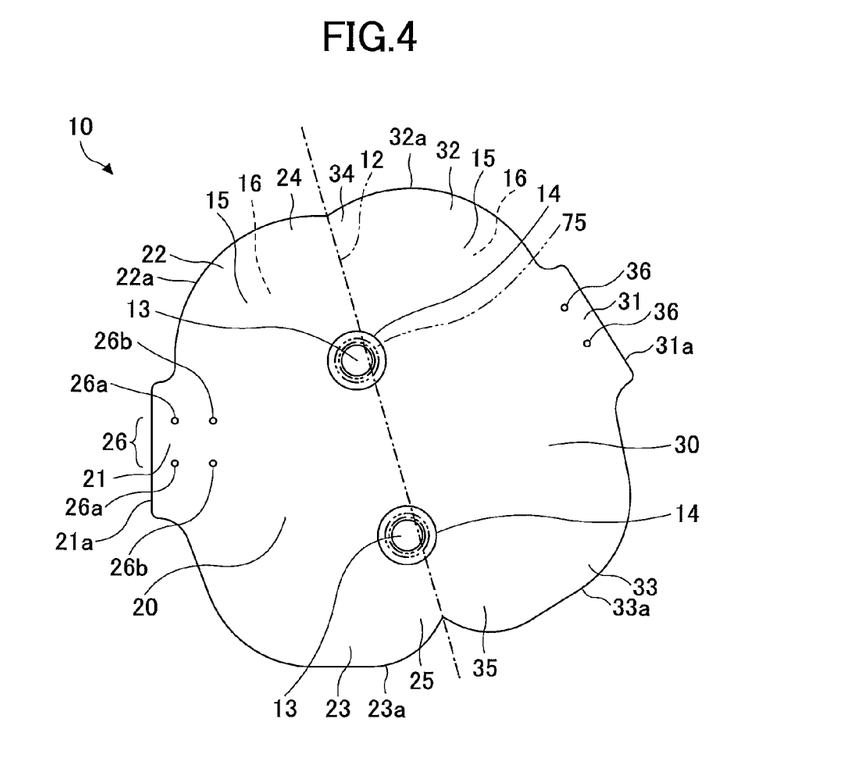
FIG. 4 is a plan view illustrating an example of a first panel.

FIG. 4 is a plan view of the panel 10 before being folded along the fold line 12 as viewed from the side where the inner face 15 is visible. The panel 10 has the left face 20 extending to form a semicircular shape on the left side of the fold line 12, and has the right face 30 extending to form a semicircular shape on the right side of the fold line 12. The left face 20 and the right face 30 are demarcated from each other by the fold line 12. The panel 10 has a shape that is symmetrical with respect to the fold line 12, but may not be perfectly symmetric.

The left face 20 has an outline that is constituted by a left edge part 21, an upper edge part 22, and a lower edge part 23 while the fold line 12 constitutes a right edge part of the left face 20. The left edge part 21 has a contour defined by a straight line edge 21a extending in a vertical direction. The upper edge part 22 has a contour defined by a curved edge 22a that bulges at the center thereof toward an upper-left direction. The lower edge part 23 has a contour defined by a curved edge 23a that bulges at the center thereof toward a lower-left direction.

The right face 30 has an outline that is constituted by a right edge part 31, an upper edge part 32, and a lower edge part 33 while the fold line 12 constitutes a left edge part of the right face 30. The right edge part 31 has a contour defined by a straight line edge 31a extending in a vertical direction. The upper edge part 32 has a contour defined by a curved edge 32a that bulges at the center thereof toward an upper-right direction. The lower edge part 33 has a contour defined by a curved edge 33a that bulges at the center thereof toward a lower-right direction.

The panel 10 has the two passage holes 13 that are arranged in a line on, or in a line to overlap, the fold line 12. Each of the passage holes is surrounded by an annular passage cloth 14 joined to the panel 10. The annular passage cloth 14 is a ground fabric having a sheet shape that is joined by sewing or the like to the inner face 15 of the panel 10 by a line-shaped double stitch 75.

Figure 5:
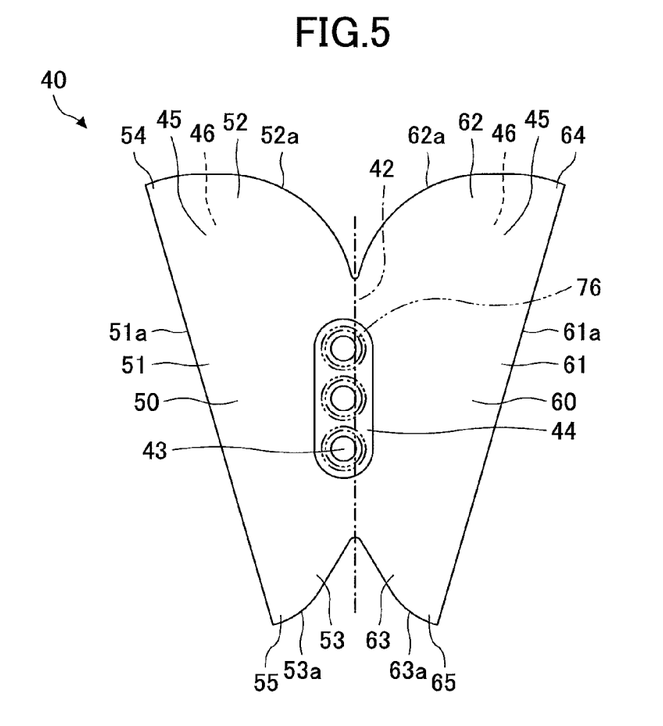
FIG. 5 is a plan view illustrating an example of a second panel.

FIG. 5 is a plan view of the panel 40 before being folded along the fold line 42 as viewed from the side where the inner face 45 is visible. The panel 40 has the left face 50 extending to form a reversed semicircular shape on the left side of the fold line 42, and has the right face 60 extending to form a reversed semicircular shape on the right side of the fold line 42. The left face 50 and the right face 60 are demarcated from each other by the fold line 42. The panel 40 has a shape that is symmetrical with respect to the fold line 42, but may not be perfectly symmetric.

The left face 50 has an outline that is constituted by a left edge part 51, an upper edge part 52, and a lower edge part 53 while the fold line 42 constitutes a right edge part of the left face 50. The left edge part 51 has a contour defined by a straight line edge 51a extending in a vertical direction. The upper edge part 52 has a contour defined by a curved edge 52a that bulges at the center thereof toward an upper-right direction. The lower edge part 53 has a contour defined by a curved edge 53a that bulges at the center thereof toward a lower-right direction.

The right face 60 has an outline that is constituted by a right edge part 61, an upper edge part 62, and a lower edge part 63 while the fold line 42 constitutes a left edge part of the right face 60. The right edge part 61 has a contour defined by a straight line edge 61a extending in a vertical direction. The upper edge part 62 has a contour defined by a curved edge 62a that bulges at the center thereof toward an upper-left direction. The lower edge part 63 has a contour defined by a curved edge 63a that bulges at the center thereof toward a lower-left direction.

The panel 40 has the three vent holes 43 that are arranged in a line on, or in a line to overlap, the fold line 42. Each of the vent holes 43 is surrounded by a vent cloth 44 joined to the panel 40. The vent cloth 44 is a ground fabric having a sheet shape that is joined by sewing or the like to the inner face 45 of the panel 40 by a line-shaped double stitch 76.

<Method of Making a Side Airbag>

Figure 6:
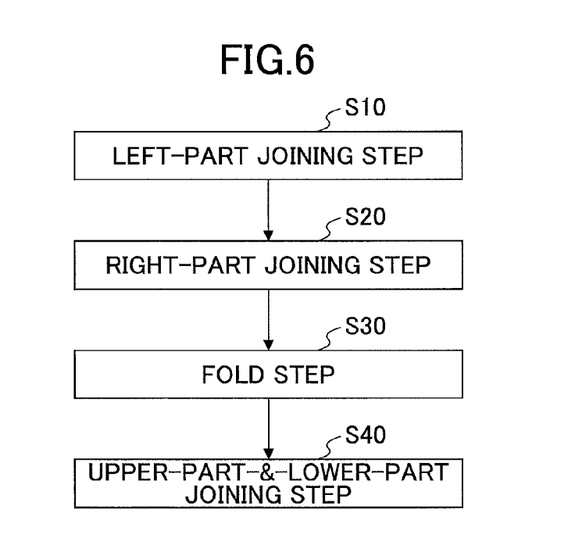
FIG. 6 is a flowchart illustrating an example of a method of making the side airbag.

FIG. 6 is a flowchart illustrating an example of a method of making the side airbag 101. The method of making the side airbag 101 includes a left-part joining step S10, a right-part joining step S20, a fold step S30, and an upper-part-&-lower-part joining step S40. The sequence in which the left-part joining step S10 and the right-part joining step S20 are performed may be reversed, or these two steps may be performed simultaneously.

The left-part joining step S10 and the right-part joining step S20 serve to join the panel illustrated in FIG. 4 and the panel 40 illustrated in FIG. 5 by sewing or the like.

In the left-part joining step S10, a worker or manufacturing apparatus (which will hereinafter be referred to collectively as "worker or the like") joins the left face 20 and the left face 50 such that the outer face 16 of the left face 20 of the panel 10 illustrated in FIG. 4 faces the inner face 45 of the left face 50 of the panel 40 illustrated in FIG. 5. The left edge part 51 of the left face 50 has a length equal to the length from a rightmost upper edge part 24 of the upper edge part 22 of the left face 20 to a rightmost lower edge part 25 of the lower edge part 23 of the left face 20. Further, an upper left edge part 54 of the left face 50 is a corner at which the left edge part 51 and the upper edge part 52 come in contact with each other. A lower left edge part 55 of the left face 50 is a corner at which the left edge part 51 and the lower edge part 53 come in contact with each other. The worker or the like aligns the rightmost upper edge part 24 of the left face 20 with the upper left edge part 54 of the left face 50, and also aligns the rightmost lower edge part 25 of the left face 20 with the lower left edge part 55 of the left face 50. While keeping such an aligned state, the worker or the like joins the inner face 45 of the left edge part 51 of the left face 50 and the outer face 16 of the left face 20 along a line from the upper edge part 22 of the left face 20 to the lower edge part 23 of the left face 20 at a position nearer to the passage holes 13 than to the left edge part 21 of the left face 20.

The worker or the like joins the inner face 45 of the left edge part 51 and the outer face 16 of the left face 20 by sewing or the like such that the edge 51a of the left edge part 51 is placed along (e.g., in parallel to) the fold line 12 in an area between the left edge part 21 and the passage holes 13. As a result, the left edge part 51 is joined to the outer face 16 of the left face 20 by a straight-line join part 71 extending in parallel to the fold line 12 as illustrated in FIG. 1, for example.

In the right-part joining step S20, the worker or the like joins the right face 30 of the panel 10 and the right face 60 of the panel 40 such that the outer face 16 of the right face 30 of the panel 10 illustrated in FIG. 4 faces the inner face 45 of the right face 60 of the panel 40 illustrated in FIG. 5. The right edge part 61 of the right face 60 has a length equal to the length from a leftmost upper edge part 34 of the upper edge part 32 of the right face 30 to a leftmost lower edge part 35 of the lower edge part 33 of the right face 30. Further, an upper right edge part 64 of the right face 60 is a corner at which the right edge part 61 and the upper edge part 62 come in contact with each other. A lower right edge part 65 of the right face 60 is a corner at which the right edge part 61 and the lower edge part 63 come in contact with each other. The worker or the like aligns the leftmost upper edge part 34 of the right face 30 with the upper right edge part 64 of the right face 60, and also aligns the leftmost lower edge part 35 of the right face 30 with the lower right edge part 65 of the right face 60. While keeping such an aligned state, the worker or the like joins the inner face 45 of the right edge part 61 of the right face 60 and the outer face 16 of the right face 30 along a line from the upper edge part 32 of the right face 30 to the lower edge part 33 of the right face 30 at a position nearer to the passage holes 13 than to the right edge part 31 of the right face 30.

The worker or the like joins the inner face 45 of the right edge part 61 and the outer face 16 of the right face 30 by sewing or the like such that the edge 61a of the right edge part 61 is placed along (e.g., in parallel to) the fold line 12 in an area between the right edge part 31 and the passage holes 13. As a result, the right edge part 61 is joined to the outer face 16 of the right face 30 by a straight-line join part 72 extending in parallel to the fold line 12 as illustrated in FIG. 2, for example.

In the fold step S30, the joined structure made of the panel 10 illustrated in FIG. 4 and the panel 40 illustrated in FIG. 5 that are joined in the left-part joining step S10 and the right-part joining step S20 is folded. The worker or the like places the left face 20 and the right face 30 one over the other by folding the joined structure such that the inner face 15 of the left face 20 faces the inner face 15 of the right face 30, and also places the left face 50 and the right face 60 one over the other by folding the joined structure such that the inner face 45 of the left face 50 faces the inner face 45 of the right face 60. The worker or the like folds the panel 10 along the fold line 12 between the left face 20 and the right face 30, and folds the panel 40 along the fold line 42 between the left face 50 and the right face 60 (see FIG. 1 and FIG. 2)

The upper-part-&-lower-part joining step S40 is performed after the fold step S30 to join the upper edge part 22 and the upper edge part 32, to join the lower edge part 23 and the lower edge part 33, to join the upper edge part 52 and the upper edge part 62, and to join the lower edge part 53 and the lower edge part 63 by sewing or the like. The worker or the like performs a joining process with respect to the panel 10 and the panel 40 such as to form the chambers 11 and 41 in the upper-part-&-lower-part joining step S40.

In the upper-part-&-lower-part joining step S40, an upper periphery portion constituted by the upper edge parts 22 and 32 of the panel 10 and the upper edge parts 52 and 62 of the panel 40 is sewed, and, also, a lower periphery portion constituted by the lower edge parts 23 and 33 of the panel 10 and the lower edge parts 53 and 63 of the panel 40 is sewed, with the fold line 12 of the panel 10 being covered by the panel 40 (see FIG. 1 and FIG. 2). As a result of such a sewing process, the upper edge parts 22 and 32 of the panel 10 and the upper edge parts 52 and 62 of the panel 40 can be joined in one step by a single joining part 73, and the lower edge parts 23 and 33 of the panel 10 and the lower edge parts 53 and 63 of the panel 40 can be joined in one step by a single joining part 74. This arrangement thus simplifies the process of joining the upper periphery portions together and joining the lower periphery portions together with respect to the side airbag 101.

Through the steps described above, the side airbag 101 as illustrated in FIG. 1 through FIG. 3 is made. The protector cloth 2 may be joined by the joining parts 73 and 74 to the outer face 16 of the left face 20 of the panel 10 in the upper-part-&-lower-part joining step S40.

As illustrated in FIG. 1, the left face 50 of the panel 40 has the left edge part 51 that is joined to the outer face 16 of the left face 20 along a line from the upper edge part 22 (i.e., the rightmost upper edge part 24 to be exact) to the lower edge part 23 (i.e., the rightmost lower edge part 25 to be exact) at a position closer to the fold line 12 than to the left edge part 21 of the left face 20. Namely, the left face 20 has an outer face portion 16a covered by the left face 50 and an outer face portion 16b exposed and not covered by the left face 50.

As illustrated in FIG. 2, the right face 60 of the panel 40 has the right edge part 61 that is joined to the outer face 16 of the right face 30 along a line from the upper edge part 32 (i.e., the leftmost upper edge part 34 to be exact) to the lower edge part 33 (i.e., the leftmost lower edge part 35 to be exact) at a position closer to the fold line 12 than to the right edge part 31 of the right face 30. Namely, the right face 30 has an outer face portion 16c covered by the right face 60 and an outer face portion 16d exposed and not covered by the right face 60.

The provision of the outer face portions 16b and 16d serves to reduce the amount of the panel 40 needed for the side airbag 101 compared with the case in which the left face 20 is fully covered by the left face 50 and the right face 30 is fully covered by the right face 60. This arrangement also provides an advantage in that the side airbag 101 can be folded into a compact size. There is also an advantage in which the side airbag 101 can be unfolded at high speed, and the side airbag 101 can have small weight.

As illustrated in FIG. 1 and FIG. 2, the left edge part 51 extends from the upper edge part 22 to the lower edge part 23, and the right edge part 61 extends from the upper edge part 32 to the lower edge part 33, so that the exposed outer face portions 16b and 16d can be expanded to form a waist area protective surface 81. This arrangement ensures a high speed at which the waist area protective surface 81 is unfolded and expands.

The waist area protective surface 81 corresponds to a lower area of the side airbag 101 in an unfolded and expanded state in a vehicle. A stomach area protective surface 82 corresponds to a middle area of the side airbag 101 in an unfolded and expanded state in a vehicle. A chest area protective surface 83 corresponds to an upper area of the side airbag 101 in an unfolded and expanded state in a vehicle.

An area size Sb of the outer face portion 16b may be wider than an area size Sa of the outer face portion 16a, and an area size Sd of the outer face portion 16d may be wider than an area size Sc of the outer face portion 16c. Such an arrangement ensures that the side airbag 101 can be folded into a more compact size.

The left edge part 51 has the upper left edge part 54 joined to the rightmost upper edge part 24 of the upper edge part 22, and also has the lower left edge part 55 joined to the rightmost lower edge part 25 of the lower edge part 23 at a position farther away from the left edge part 21 than is the upper left edge part 54. Namely, a distance D1 between the lower left edge part 55 and the left edge part 21 is longer than a distance D2 between the upper left edge part 54 and the left edge part 21. Similarly, the right edge part 61 has the upper right edge part 64 joined to the leftmost upper edge part 34 of the upper edge part 32, and also has the lower right edge part 65 joined to the leftmost lower edge part 35 of the lower edge part 33 at a position farther away from the right edge part 31 than is the upper right edge part 64. Namely, a distance D3 between the lower right edge part 65 and the right edge part 31 is longer than a distance D4 between the upper right edge part 64 and the right edge part 31.

The provision of the distance D1 longer than the distance D2 and the distance D3 longer than the distance D4 can further increase the area size of the outer face portions 16b and 16d exposed to form the waist area protective surface 81. This arrangement ensures a yet higher speed at which the waist area protective surface 81 is unfolded and expands.

As illustrated in FIG. 1, the left edge part 21 of the panel 10 has a plurality of mounting holes 26 arranged in a vertical direction as defined in the state in which the side airbag 101 is installed in the vehicle. As illustrated in FIG. 2, the right edge part 31 of the panel 10 has a plurality of mounting holes 36 arranged in a vertical direction as defined in the state in which the side airbag 101 is installed in the vehicle. The mounting holes 26 and 36 are used to mount the inflator 1 which will be described later. The inflator 1 is an example of a gas supply unit (i.e., gas generator) to supply gas to the chambers 11 and 41.

<Method of Folding a Side Airbag>

FIGS. 7 through 12 illustrate an example of the procedure for folding the side airbag 101 to which the inflator 1 is mounted.

Figure 7:
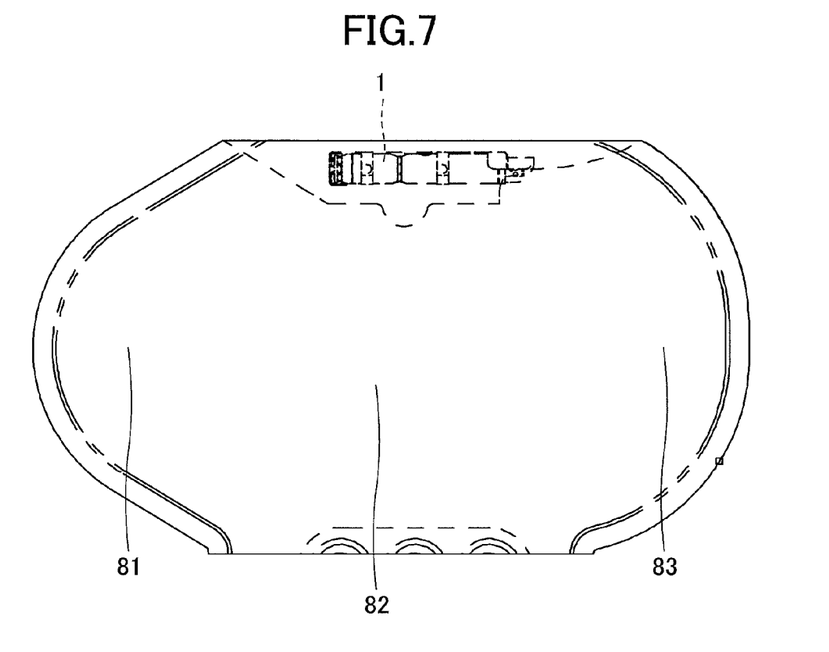
FIG. 7 is a drawing illustrating an example of the method of folding the side airbag.

In FIG. 7, the inflator 1 is fully inserted through an inlet 17 (see FIG. 3) that is formed between the line edge 21a of the left edge part 21 and the line edge 31a of the right edge part 31. Two mounting foot 1a (see FIG. 12) of the inflator 1 are inserted into the mounting holes 26b (see FIGS. 1 through 3).

In FIG. 7, the worker or the like folds the left edge part 21 and the right edge part 31 at which the inflator 1 is mounted such that the left face 20 is placed inside when folded along a fold line parallel to the longitudinal direction of the inflator 1.

Figure 8:
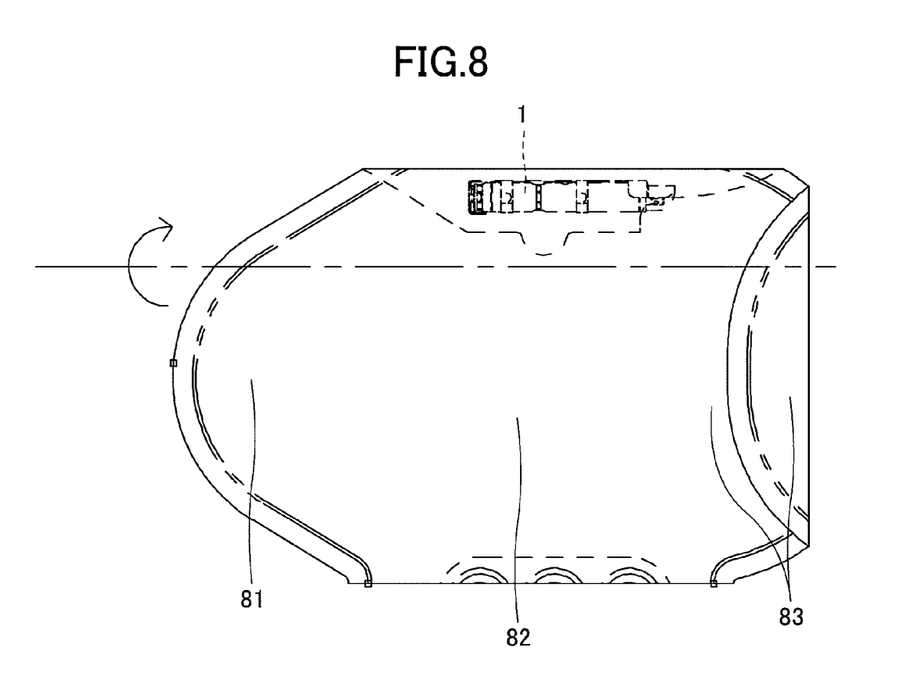
FIG. 8 is a drawing illustrating an example of the method of folding the side airbag.

In FIG. 8, the worker or the like folds the chest area protective surface 83 such that the right faces 30 and 60 are placed inside when folded along a fold line perpendicular to the longitudinal direction of the inflator 1. After folding the chest area protective surface 83, the worker or the like folds all of the waist area protective surface 81, the stomach area protective surface 82 and the chest area protective surface 83 such that the right face 30 is placed inside when folded along a fold line parallel to the longitudinal direction of the inflator 1. With this, the folded state as illustrated in FIG. 9 is obtained.

Figure 9:
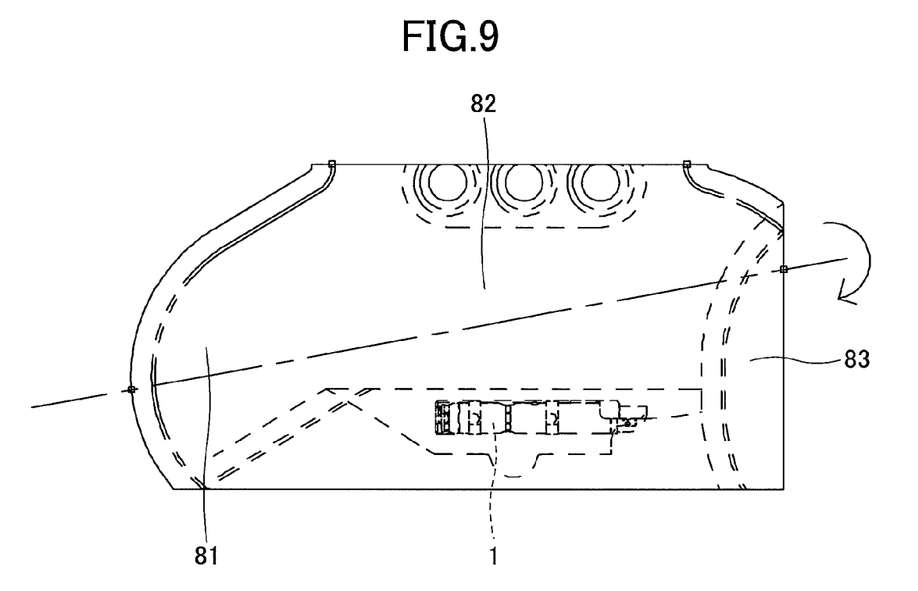
FIG. 9 is a drawing illustrating an example of the method of folding the side airbag.

In FIG. 9, the worker or the like folds all of the waist area protective surface 81, the stomach area protective surface 82 and the chest area protective surface 83 such that the left face 20 is placed inside when folded along a fold line at an acute angle relative to the longitudinal direction of the inflator 1. With this, the folded state as illustrated in FIG. 10 is obtained.

Figure 10:
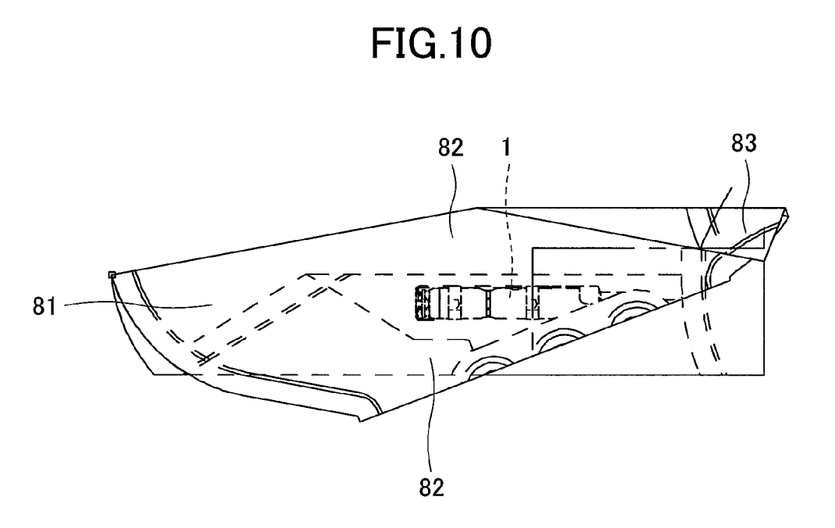
FIG. 10 is a drawing illustrating an example of the method of folding the side airbag.

In FIG. 10, the worker or the like rolls up the stomach area protective surface 82 several turns. With this, the folded state as illustrated in FIG. 11 is obtained.

Figure 11:
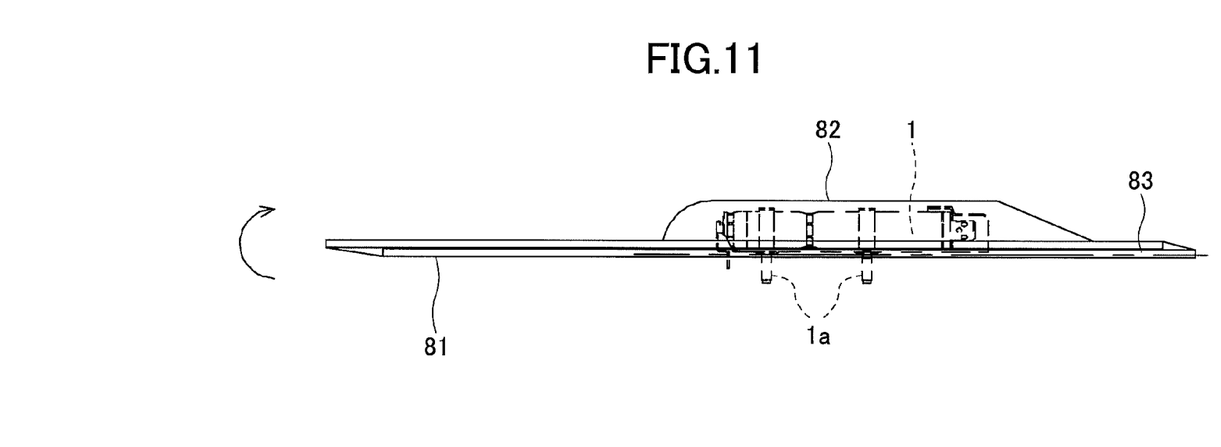
FIG. 11 is a drawing illustrating an example of the method of folding the side airbag.

In FIG. 11, the worker or the like folds the waist area protective surface 81 several times. With this, the folded state as illustrated in FIG. 12 is obtained.

Figure 12:
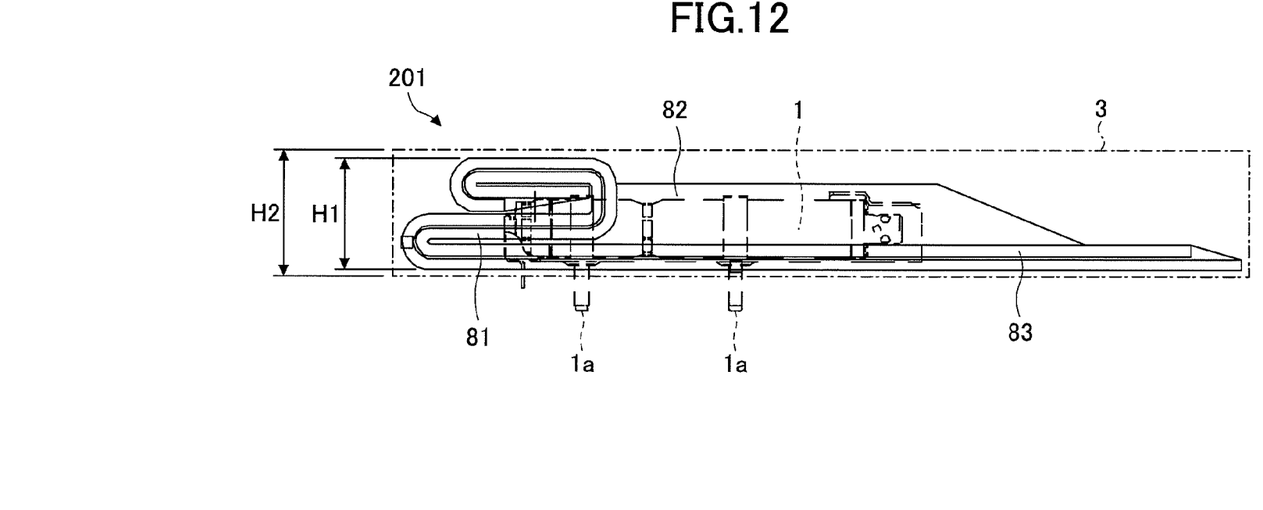
FIG. 12 is a front transparent view of an example of an airbag apparatus.

FIG. 12 illustrates the side airbag 101 that is folded with the inflator 1 enclosed therein and that is stored in a casing 3 of an airbag apparatus 201. The casing 3 is a housing in which the side airbag 101 folded with the inflator 1 is stored. The airbag apparatus 201 may be installed on a side part of the backrest of a seat such that the longitudinal direction of the inflator 1 extends in the vertical direction in the vehicle.

As was described above, the outer face portions 16b and 16d exposed at the position of the waist area protective surface 81 are relatively wide (i.e., the area size of the overlap between the panel 10 and the panel 40 at the position of the waist area protective surface 81 is relatively small), so that a height H1 of the mass of the folded waist area protective surface 81 can be made low. The low height H1 means that a height H2 of the casing 3 is also low, which makes it easier to secure the space for placing the airbag apparatus 201.

Although the side airbag, the airbag apparatus, and the method of making the side airbag have been described heretofore with reference to particular embodiments, the present invention is not limited to those embodiments. Various modifications and improvements such as combining an embodiment partially or entirely with one or more other embodiments or replacing part of an embodiment with part of another embodiment may be made without departing from the scope of the present invention.

For example, all or part of the edge 51a of the left edge part 51 may be curved, and all or part of the edge 61a of the right edge part 61 may be curved. Further, all or part of the join parts 71 and 72 may be curved.

The present application is based on and claims the benefit of priority of Japanese priority application No. 2013-272773 filed on Dec. 27, 2013, with the Japanese Patent Office, the entire contents of which are hereby incorporated by reference.

What is claimed is:

1. A side airbag, comprising:
    a first panel having a first left face and a first right face, the first panel being folded along a fold line such that the first left face overlaps the first right face to form a first chamber therebetween;
    a second panel having a second left face and a second right face, the second panel being folded such that the second left face overlaps the second right face to form a second chamber therebetween;
    wherein the first panel has a hole that allows flow of gas from the first chamber to the second chamber,
    wherein the second left face has a second left edge part joined to the first left face along a line from a first upper edge part of the first left face to a first lower edge part of the first left face at a position closer to the fold line of the first panel than to a first left edge part of the first left face, and
    wherein the second right face has a second right edge part joined to the first right face along a line from a second upper edge part of the first right face to a second lower edge part of the first right face at a position closer to the fold line of the first panel than to a first right edge part of the first right face,
    wherein the second left edge part has an upper left edge part joined to the first upper edge part, and has a lower left edge part joined to the first lower edge part at a position farther away from the first left edge part than is the upper left edge part, and the second right edge part has an upper right edge part joined to the second upper edge part, and has a lower right edge part joined to the second lower edge part at a position farther away from the first right edge part than is the upper right edge part.

2. The side airbag as claimed in claim 1, wherein an area size of a portion of the first left face that is not covered by the second left face is wider than an area size of a portion of the first left face that is covered by the second left face, and wherein an area size of a portion of the first right face that is not covered by the second right face is wider than an area size of a portion of the first right face that is covered by the second right face.

3. The side airbag as claimed in claim 1, wherein the second left edge part is joined to the first left face along the fold line, and the second right edge part is joined to the first right face along the fold line.

4. The side airbag as claimed in claim 1, wherein the first left edge part and the first right edge part have mounting holes for mounting a gas supply unit that supplies the gas.

5. An airbag apparatus, comprising:
   the side airbag of claim 1;
   a gas supply unit configured to supply the gas; and
   a casing configured to accommodate the side airbag and the gas supply unit.

6. A method of making a side airbag, comprising:
   a left-part joining step of joining a first left face of a first panel and a second left face of a second panel by joining a second left edge part of the second left face to the first left face along a line from a first upper edge part of the first left face to a first lower edge part of the first left face at a position closer to an opening formed through the first panel than to a first left edge part of the first left face;
   a right-part joining step of joining a first right face of the first panel and a second right face of the second panel by joining a second right edge part of the second right face to the first right face along a line from a second upper edge part of the first right face to a second lower edge part of the first right face at a position closer to the opening formed through the first panel than to a first right edge part of the first right face;
   a fold step of folding the first panel and the second panel such that the first left face and the first right face overlap each other and such that the second left face and the second right face overlap each other; and
   a upper-part-and-lower-part joining step of joining the first upper edge part and the second upper edge part, joining the first lower edge part and the second lower edge part, joining a third upper edge part of the second left face and a fourth upper edge part of the second right face, and joining a third lower edge part of the second left face and a fourth lower edge part of the second right face,
   wherein the second left edge part has an upper left edge part joined to the first upper edge part, and has a lower left edge part joined to the first lower edge part at a position farther away from the first left edge part than is the upper left edge part, and the second right edge part has an upper right edge part joined to the second upper edge part, and has a lower right edge part joined to the second lower edge part at a position farther away from the first right edge part than is the upper right edge part.

7. The method as claimed in claim 6, wherein the upper-part-and-lower-part joining step is performed by sewing an upper periphery portion constituted by the upper edge parts of the first panel and the upper edge parts of the second panel and sewing a lower periphery portion constituted by the lower edge parts of the first panel and the lower edge parts of the second panel, with the fold line of the first panel being covered by the second panel.

* * * * *